US009928685B2

(12) United States Patent
Mound

(10) Patent No.: US 9,928,685 B2
(45) Date of Patent: Mar. 27, 2018

(54) SYSTEM AND METHOD WHEREIN GAME PLAYERS ARE PROVIDED ELECTRONIC MAPS TO COMMUNICATION-ENABLED LOCATIONS TO PERFORM GAME ACTIVITIES AT THE LOCATIONS

(71) Applicant: Scientific Games International, Inc., Newark, DE (US)

(72) Inventor: Andrew Jonathan Mound, Atlanta, GA (US)

(73) Assignee: Scientific Games International, Inc., Newark, DE (US)

( * ) Notice: Subject to any disclaimer, the term of this patent is extended or adjusted under 35 U.S.C. 154(b) by 49 days.

(21) Appl. No.: 14/949,150

(22) Filed: Nov. 23, 2015

(65) Prior Publication Data

US 2016/0155295 A1 Jun. 2, 2016

Related U.S. Application Data

(60) Provisional application No. 62/085,899, filed on Dec. 1, 2014.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.

CPC ........ *G07F 17/3241* (2013.01); *G07F 17/323* (2013.01); *G07F 17/3209* (2013.01); *G07F 17/329* (2013.01); *G07F 17/3218* (2013.01); *G07F 17/3223* (2013.01)

(58) Field of Classification Search

CPC ........ G07F 17/32

See application file for complete search history.

(56) References Cited

U.S. PATENT DOCUMENTS 6,632,142 B2 * 10/2003 Keith ........ A63F 13/12 463/42
9,208,652 B2 12/2015 Aligizakis et al.
(Continued)

FOREIGN PATENT DOCUMENTS

WO WO 2014/179323 A1 11/2014

OTHER PUBLICATIONS

International Search Report & Written Opinion, dated Feb. 10, 2016.

(Continued)

*Primary Examiner* — Kevin Y Kim
(74) *Attorney, Agent, or Firm* — Dority & Manning, P.A.

(57) ABSTRACT

A system and method are provided for enabling performance by players of game-related activities at authorized physical locations, such as retail establishments. A plurality of physical locations are designated as authorized communication-enabled locations and are configured with a transmitter device that broadcasts a unique ID signal or a receiver that receives the unique ID signal. The identity and location of the communication-enabled locations are published to the players via an electronic map on a website accessible by the players. The electronic map also informs the players of game-related functions that are able to be performed by the players at the respective communication-enabled locations.

14 Claims, 6 Drawing Sheets

(56) References Cited

U.S. PATENT DOCUMENTS

| | | | | |
|---|---|---|---|---|
| 2002/0082921 | A1 | 6/2002 | Rankin | |
| 2002/0090985 | A1* | 7/2002 | Tochner | A63F 13/12 463/1 |
| 2006/0025222 | A1 | 2/2006 | Sekine | |
| 2008/0146338 | A1* | 6/2008 | Bernard | A63F 13/00 463/42 |
| 2008/0146346 | A1* | 6/2008 | Hardy | G07F 17/32 463/42 |
| 2008/0305875 | A1* | 12/2008 | Heim | G07F 17/3293 463/42 |
| 2009/0113296 | A1* | 4/2009 | Lacy | G01C 21/3667 715/700 |
| 2010/0211431 | A1 | 8/2010 | Lutnick et al. | |
| 2011/0081958 | A1 | 4/2011 | Herrmann et al. | |
| 2011/0086693 | A1 | 4/2011 | Guziel et al. | |
| 2012/0094769 | A1 | 4/2012 | Nguyen et al. | |
| 2012/0214568 | A1 | 8/2012 | Herrmann | |
| 2013/0017884 | A1 | 1/2013 | Price et al. | |
| 2013/0065584 | A1 | 3/2013 | Lyon et al. | |
| 2013/0116032 | A1 | 5/2013 | Lutnick | |
| 2013/0157569 | A1* | 6/2013 | Torvmark | H04W 4/008 455/41.2 |
| 2014/0051507 | A1 | 2/2014 | Shapiro et al. | |
| 2014/0222574 | A1 | 8/2014 | Emigh et al. | |
| 2014/0370959 | A1 | 12/2014 | Yacenda | |

OTHER PUBLICATIONS

Co-Pending U.S. Appl. No. 14/948,833, filed Nov. 23, 2015.
Co-Pending U.S. Appl. No. 14/948,899, filed Nov. 23, 2015.
Co-Pending U.S. Appl. No. 14/948,958, filed Nov. 23, 2015.
Co-Pending U.S. Appl. No. 14/949,011, filed Nov. 23, 2015.
Co-Pending U.S. Appl. No. 14/959,054, filed Nov. 23, 2015.
Co-Pending U.S. Appl. No. 14/949,096, filed Nov. 23, 2015.
Co-Pending U.S. Appl. No. 14/859,999, filed Sep. 21, 2015.

* cited by examiner

SYSTEM AND METHOD WHEREIN GAME PLAYERS ARE PROVIDED ELECTRONIC MAPS TO COMMUNICATION-ENABLED LOCATIONS TO PERFORM GAME ACTIVITIES AT THE LOCATIONS

RELATED APPLICATION

The present application claims priority to U.S. Provisional Patent Application No. 62/085,899, filed Dec. 1, 2014, the entire disclosure of which is incorporated herein by reference in its entirety for all purposes.

FIELD OF THE INVENTION

The present invention relates to conducting games of chance, such as lottery games, wherein players conduct game-related activities at authorized locations, such as retail establishments, and are provided electronic maps to the locations.

BACKGROUND

Lottery games have become a time honored method of raising revenue for state and federal governments the world over. The success of these games, however, depends on continuous innovations that capture the interests of current players and draw new players to the games.

As with other consumers, lottery players are becoming more tech savvy, and are interested in conducting various gaming aspects via electronic devices, such as smart phones. The gaming industry is appreciative of this fact, and is seeking ways to integrate games and gaming-related functions into the rapidly developing mobile electronic communication age.

With conventional systems and methods, authorized retail vendors within a lottery jurisdiction are the primary means of lottery ticket sales and distribution. This relationship has been beneficial to the vendors in that lottery players also tend to purchase additional goods in the retail establishment. The gaming authority (e.g., a state or other governmental lottery authority) benefits in that a wide and varied sales and distribution network is provided by the authorized retail establishments.

It is important that new innovations in the gaming industry, particularly with respect to electronic gaming via smart phones or other portable mobile devices, attempt to preserve this mutually beneficial relationship. This is of particular concern to the retail vendors as electronic and on-line lottery ticket sales are growing in acceptance and popularity, and could potentially decrease lottery player traffic to the retail establishments.

The lottery industry is thus continuously seeking new and creative gaming scenarios that provide increased entertainment value to players, entice new players, and expand play of lottery games into the smart electronic communication age while at the same time maintaining or increasing lottery player foot traffic to the conventional ticket sales retail establishments

SUMMARY OF THE INVENTION

Objects and advantages of the invention will be set forth in part in the following description, or may be obvious from the description, or may be learned through practice of the invention.

In particular embodiments, a system and method are provided for enabling performance by players of game-related activities at authorized physical locations. A plurality of the physical locations, such as a retail establishment, convenience store, pub, and the like, are designated as authorized communication-enabled locations and are configured with a transmitter device that broadcasts an ID signal unique to the location, such as a BTLE (Bluetooth Low Energy) beacon, or a receiver that receives an ID signal unique to a particular player, such a BTLE-enabled receiver. The players are provided with capability to receive the unique ID signals emitted by the transmitter devices within the communication-enabled locations on a mobile smart device, or to broadcast the ID signal unique to the player for receipt by the receiver in the communication-enabled locations.

A game server is common to the communication-enabled locations, wherein for each of the players in one of the communication-enabled locations, the game server receives a transmission that includes at least part of the ID signal unique to the respective communication-enabled location or the ID signal unique to the player. The game server thereby identifies the players and their respective communication-enabled location.

The identity and location of the communication-enabled locations is provided to the players via an electronic map accessible by the players, for example at a website accessed by the players. The electronic map also informs the players of game-related functions that are able to be performed by the players at each of the respective communication-enabled locations.

BRIEF DESCRIPTION OF THE DRAWINGS

A full and enabling description of the present invention is provided herein, with reference to particular embodiments depicted in the attached drawings and described below.

FIG. 9 is a screen shot of a web page displaying a plurality of authorized communication-enabled locations, as well as the particular time and in-store game show the location will participate in.

DETAILED DESCRIPTION

Figure 1:
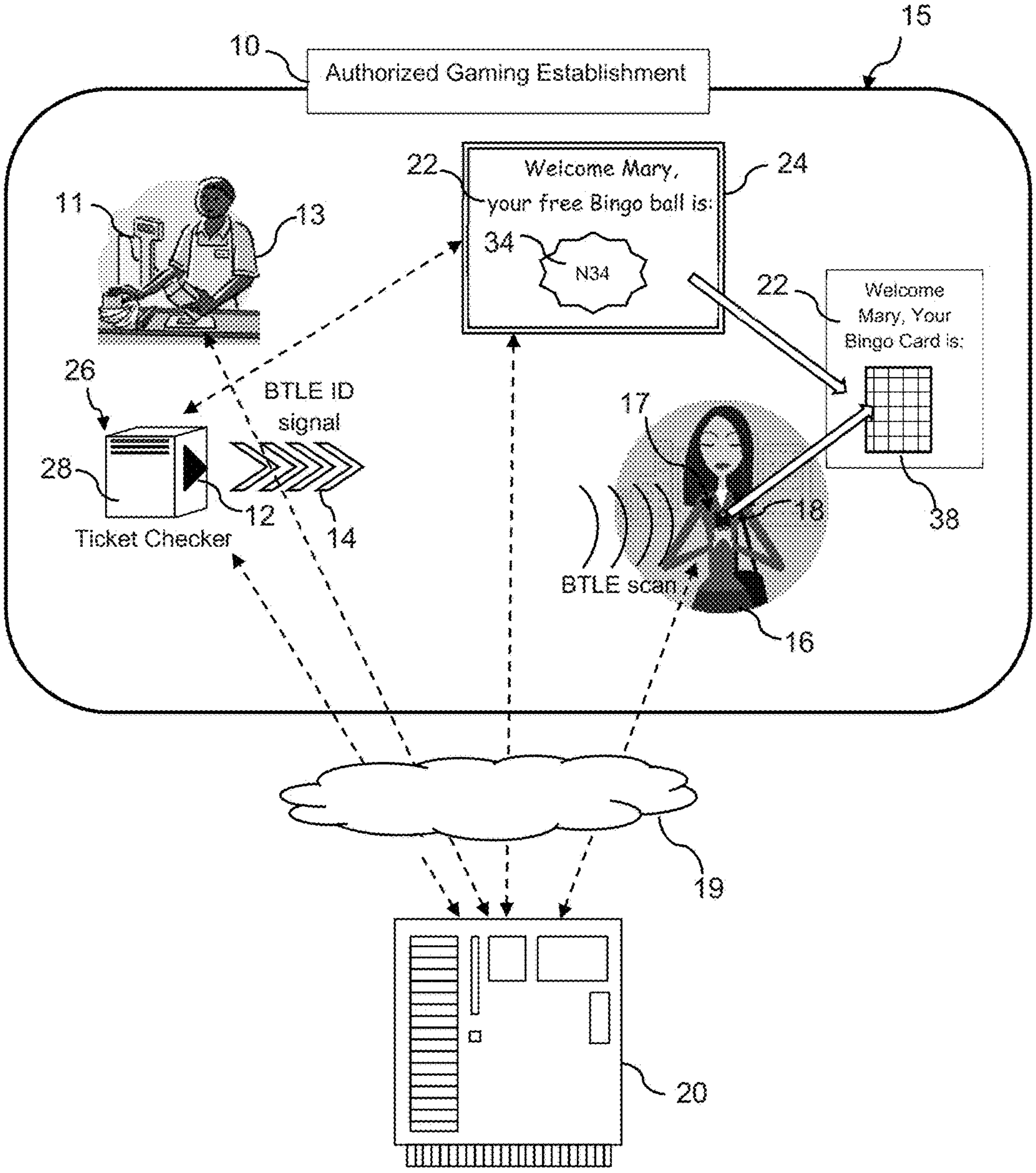
FIG. 1 is a diagram illustration of a system and method for conducting aspects of the present invention wherein a player visits a communication-enabled location to play all or part of a game.

Reference will now be made in detail to embodiments of the inventive methods and systems, one or more examples of which are illustrated in the drawings. Each embodiment is presented by way of explanation of the invention, and not as a limitation of the invention. For example, features illustrated or described as part of one embodiment may be used with another embodiment to yield still a further embodiment. It is intended that the present invention include these and other modifications and variations as come within the scope and spirit of the invention.

In general, the present disclosure is directed to computer and communication device-implemented methods and systems for conducting aspects of a game, such as a lottery game, at remote locations, wherein players visit the locations to conduct the gaming activities. For sake of example only, the following discussion relates to embodiments of the invention drawn to lottery primary games, bonus games, and second chance games sponsored by state or other jurisdictional lottery authorities. It should be appreciated, however, that the system and method are just as applicable to gaming activities linked to any manner of other gaming authority, such as games conducted within a gaming establishment (e.g., a casino) for patrons of such establishment, or electronic games conducted via an electronic network, such as the internet, for authorized players.

FIG. 1 is a diagram illustration of a system and method 15 in accordance with an embodiment of the invention. An establishment or location 10, such as a retail store, convenience store, pub, restaurant, or the like, is authorized by a lottery jurisdiction to carry out lottery activities, such as the sale of instant scratch-off tickets via a clerk 13, or terminal based tickets for draw games such as Powerball™ issued from a lottery terminal 11. The lottery jurisdiction may be a state lottery authority, such as the Pennsylvania Lottery Authority, or any other governmental jurisdictional authority. A separate game provider may be partnered with the lottery jurisdiction to provide certain control, implementation, and logistical functions of the game. It should be appreciated that the type of location 10 or lottery jurisdiction entities are not limiting factors of the invention.

A plurality of the locations 10 within the lottery jurisdiction are each equipped with a communication device, such as a transmitter device 12 or scanner/receiver device 17 (FIG. 3), wherein an intermittently transmitted data packet or signal 14 is transmitted and received within a limited range. In this regard, the locations 10 are referred to as communication-enabled locations. It has been found that Bluetooth Low Energy (BTLE) technology is particularly well-suited for use with the present subject matter. For example, the transmitter devices 12 may be BTLE beacons and the scanner/receiver devices 17 may be any component configured to receive and recognize the BTLE formatted signal 14.

BTLE devices are well-known to those skilled in the art, and a detailed explanation of their function and operation is not necessary for an understanding and appreciation of the present invention. Briefly, BTLE beacons are a class of low-energy, low-cost radio transmitters that can notify mobile smart devices 18 (e.g., iOS 7 smart phones) running BTLE applications of their presence, which in turn enables the smart device 18 to perform certain actions when in close proximity to the beacon. These devices are often referred to as "iBeacons", which is the name Apple chose for its implementation of the BTLE technology. Each BTLE beacon broadcasts a unique identification signal 14 using the BTLE standard format. These signals 14 are also known as iBeacon "advertisements." The mobile smart device 18 runs a background application that enables the device to scan for and receive the signals 14 within transmitting range of the BTLE beacons. The mobile smart device 18 will automatically "react" to the received signal 14 and may start other BTLE-enabled applications for various purposes, including communication with a central server 20.

A typical use of BTLE technology is relatively precise indoor geo-location ("micro-location"). A BTLE-enabled application on the mobile smart device is notified when the device moves in an out of range of the BTLE beacon, and thus is able to determine distance to the transmitter. The exact geo-location of the transmitter is known, and thus the exact location of the mobile smart device is calculated based on relative distance from the transmitter as a function of signal strength. With this location information, a server in communication with the smart device can generate a message to the person telling them, for example, that a number of close-by items in the store are on sale, and so forth.

It should be appreciated that the present systems and methods are not limited to BTLE technology. Other transmitter/receiver technologies may also be utilized for practice of the invention. For example, Near Field Communication (NFC) implementations may be utilized. In another embodiment, Radio Frequency Identification (RFID) technology may be used. Other communication technologies are also within the scope and spirit of the invention.

Referring again to FIG. 1, a patron 16 is depicted within the authorized gaming location 10, which may be a grocery store or convenience store authorized by a respective lottery jurisdiction to conduct lottery related activities within the lottery jurisdiction. In this particular embodiment, the location 10 has one or more transmitter devices 12, such as BTLE beacons, at strategic locations to transmit a BTLE ID signal 14 that is unique to the particular transmitter (and thus unique to the location 10) to areas of the location 10 in which the patrons 16 are likely to pass or visit. Any number and pattern of the transmitters 12 may be deployed to ensure select or complete coverage of the public areas of the location. In this regard, the location 10 is considered as "communication-enabled." The transmitters 12 may be hidden from view or disguised as some other component, e.g., an air freshener or camera. In particular embodiments, the transmitter 12 is incorporated with another functional component 26 of the overall lottery or gaming system. For example, the location 10 may provide an electronic ticket checker 28 wherein lottery game players can scan a previously purchased ticket to check whether or not such ticket is entitled to a prize. The transmitter 12 may be configured on or within the ticket checker 28.

As discussed above, the beacon or transmitter device 12 (referred to generically as "transmitter" herein) may function in "transmit" or "peripheral" mode wherein it intermittently broadcasts its unique ID signal 14. If the transmitter 12 is a BTLE beacon, then the signal 14 is transmitted using the BTLE standard format. The signal 14 is unique to the transmitter 12. Thus, by maintaining a library of the transmitter devices 12 (and respective unique ID signals 14) and their respective locations, a game server 20 can readily determine which transmitters 12 are within each communication-enabled location 10.

The patron 16 within the location 10 may also be a game player, in which the player 16 has on their person a mobile smart device 18, such as a smart phone, tablet, PDA, or other network-enabled device (all referred to herein generically as a "mobile smart device"). The mobile smart device 18 runs a low-power background application previously downloaded by the player 16 from a source (e.g. a website) maintained by the lottery authority or lottery game provider. This application allows the mobile smart device 18 to function as a scanner or receiver 17 in a scan or "central" mode to receive the signals 14 if within range of the transmitters 12. Once the mobile smart device 18 detects a signal 14 from the transmitter 12, certain other application functions are initiated. For example, the mobile smart device 18 will automatically "react" to the received signal 14 and start other BTLE-enabled applications.

The location 10 may be equipped with any manner of additional functional components 26 to facilitate or make the gaming experience more enjoyable to the player 16. For example, FIG. 1 depicts a large screen audio-video display 24 that may be used to inform players 16 of various lottery functions that have been facilitated or enabled by the player 16 visiting the communication-enabled location 10. The display 24 may be controlled directly by the game server 20, or via another functional component that is in communication with the server 20, such as the ticket checker 28.

FIG. 1 depicts the central game server 20 that is common to the communication-enabled locations 10. The term "game server" is used herein to encompass any configuration of computer hardware and software that is maintained by a lottery authority or game provider to carry out the functionalities of the present invention, as well as any manner of additional lottery functions. It should be readily appreciated that the server 20 may include an integrated server, or any manner of periphery server or other hardware structure. While the player 16 is in one of the locations 10 and within operating range of the BTLE transmitter and receiver components, the game server 20 is simultaneously in communication with any one or combination of the functional components 26 (e.g., ticket checker 28, display 24) and the player's mobile smart device 18, as described in greater detail below.

The game server 20 is typically remote from the location 10, and is in communication with the plurality of the locations 10 via a suitable secure communication network 19, which may include any manner of wide area network, wireless internet, or cloud computing.

The game server 20 may be a single networked computer, or a series of interconnected computers having access to the communications network via a gateway or other known networking system. Generally, the game server 20 is configured to communicate with, manage, execute and control individual lottery terminal units within the lottery jurisdiction, including the lottery terminals 13 within the transmitter-enabled locations 10, and to interface with the network enabled mobile smart devices 18 of the players 16 that enter the locations 10. The game server 20 may include a memory for storing gaming procedures and routines, a microprocessor (MP) for executing the stored programs, a random access memory (RAM) and an input/output (I/O) bus. These devices may be multiplexed together via a common bus, or may each be directly connected via dedicated communications lines, depending on the needs of the system 100.

The game server 20 may be directly or indirectly connected through the I/O bus to any manner of peripheral devices such as storage devices, wireless adaptors, printers, and the like. In addition, a database (DB) may be communicatively connected to the game server 20 and provide a data repository for the storage and correlation of information gathered from the individual components 28, 24, 18. The information stored within the database may be information relating to individual players, games, or game card specific information.

It should be appreciated that embodiments of the methods and systems disclosed herein may be executed by one or more suitable networked lottery gaming components within a plurality of the locations 10, as well as a remote central computer system. Such system(s) may comprise one or more computing devices adapted to perform one or more embodiments of the methods disclosed herein. Such gaming systems and computing devices may access one or more computer-readable media that embody computer-readable instructions which, when executed by at least one computer, cause the computer(s) to implement one or more embodiments of the methods of the present subject matter. Additionally or alternatively, the computing device(s) may comprise circuitry that renders the device(s) operative to implement one or more of the methods of the present subject matter. Furthermore, components of the presently-disclosed technology may be implemented using one or more computer-readable media.

As mentioned above, aspects of the present systems and methods rely on the transmission of data over one or more communications networks. It should be appreciated that network communications can comprise sending and/or receiving information over one or more networks of various forms. For example, a network can comprise a dial-in network, a local area network (LAN), wide area network (WAN), public switched telephone network (PSTN), the Internet, intranet or other type(s) of networks. A network may comprise any number and/or combination of hard-wired, wireless, or other communication links.

Referring again to the embodiment depicted in FIG. 1, the game server 20 is in communication with the lottery component 26 that incorporates the transmitter 12 for controlling the functions of the component 26, such as the scanning and verifying capability of the ticket checker 28. This communication path may also allow the server 20 to control and/or monitor the operating status of the transmitter 12. In certain embodiments, the transmitter 12 may be programmable, for example to change the unique ID signal 14 emitted by the transmitter 12, and this function may be controlled by the game server 20. In other embodiments, such as BTLE beacons, the transmitter 12 is not programmable, but the game server 20 may monitor the operating status of the device. The functional component 26 may, in turn, have a dedicated display or be in communication with the large screen display 24, by way of which the game server 20 controls the display 24. Alternatively, the server 20 may be in direct communication with the display 24 if the display is also equipped with a processor.

In the configuration of FIG. 1, the player's mobile smart device 18 is in scan or central mode and detects the unique ID signal 14 from the transmitter 12. At this point, an application may be started to cause the device 18 to communicate with the game server 20 and relay at least the ID content of the signal 14 to the server 20. The application also identifies the player 16 to the server 20. For example, a unique player account number or other unique player ID code is transmitted to the server 20 along with the content of signal 14. With this information, the server 20 can access the player account and is thus aware of the identity of the player 16 that is at the particular communication-enabled location 10.

At this point, the server 20 can issue any manner of personalized message 22 to the player 16 via, for example the display 24, other functional component 26, or directly to the player's mobile smart device 18. This message 22 is related to a gaming function or feature in a game (e.g., a primary, bonus, or second-chance lottery game) that the player is entitled to because they have visited the location 10. Such features may only be provided to players that visit a location 10, as compared to other players in the same game that have not visited a communication-enabled location 10. For example, FIG. 1 depicts a Bingo game wherein the player 16 ("Mary") plays one or more electronic Bingo game cards 38, which may be game cards in a primary lottery game, a bonus game, or a second chance lottery game. The player's game cards 38 are stored electronically in a respective player account, and are automatically retrieved and displayed to the player 16 via the mobile smart device 18, which may generate an alert to the player 16 once the game cards 38 have been transmitted by the server 20. In an alternative embodiment, the game cards 38 may be displayed directly on the screen 24 so that the player 16 does not have to physically interact with their mobile device 18. In this particular game, because Mary has visited the location 10, she is awarded a "free" Bingo number (e.g., "N34") that may be used by Mary to complete a particular pattern on one or more of the cards 38 for a winning play. This "free" number (or other type of game indicia) may only be awarded to players of the game that visit one of the locations 10 with an enabled mobile smart device 18, as described above.

The free game indicia 34 (e.g., a Bingo number) may be randomly generated at each occurrence of a player visit to one of the locations 10. Alternatively, the free indicia may be randomly assigned to specific locations 10 for a set time. For example, the free Bingo number "N34" may be randomly generated and assigned to a particular location 10 for a 24-hour period such that all players 16 that visit the location 10 with an enabled device 18 will receive the same "N34" within the 24-hour period.

Figure 2:
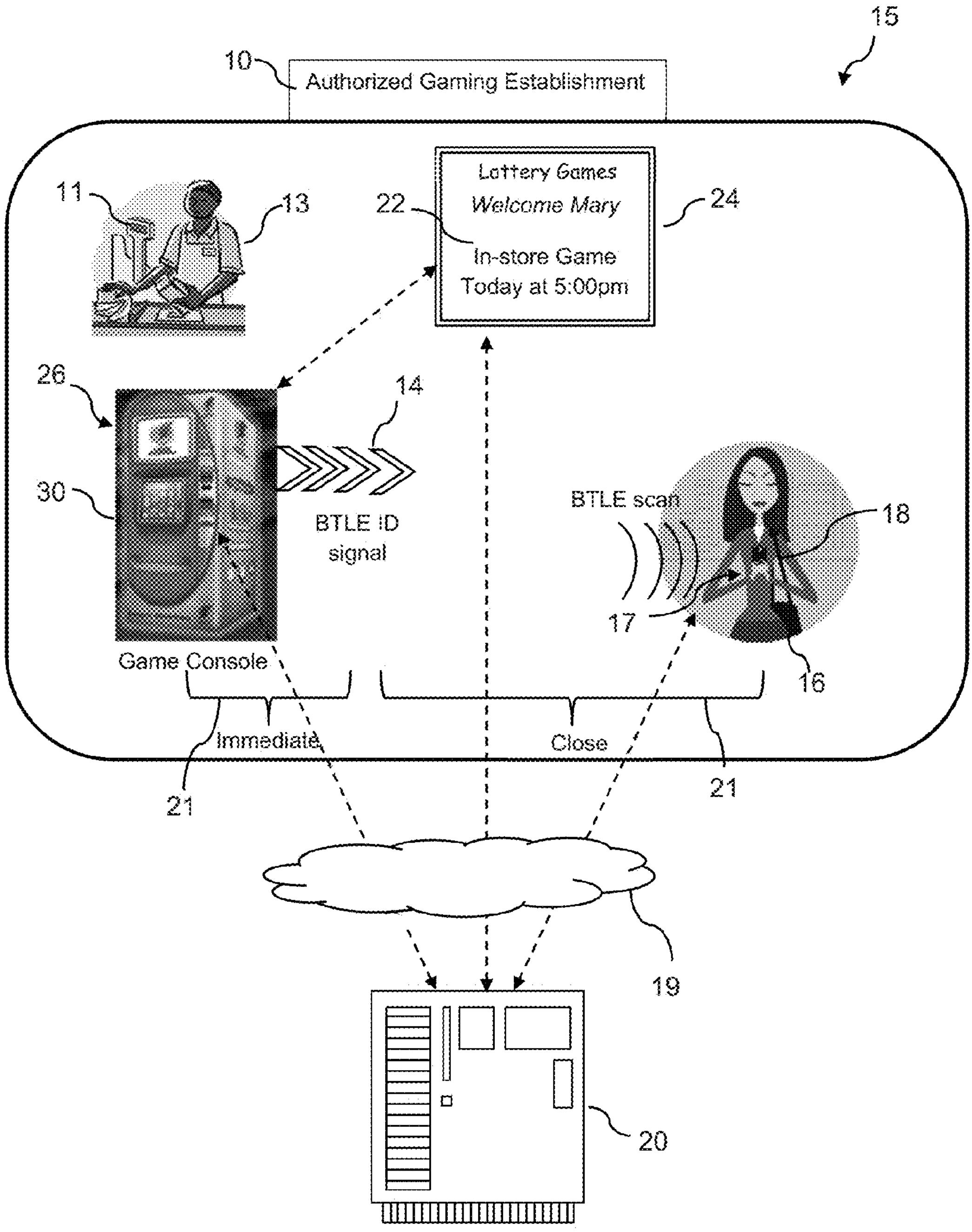
FIG. 2 is a diagram illustration of an alternate embodiment of a system and method wherein a player visits a communication-enabled location to play all or part of a game.

FIG. 2 depicts a system and method embodiment wherein the functional component 26 is a game console 30 having a display and an input device, such as a ticket scanner, keyboard, touchscreen, or the like. This console 30 may have the transmitter 12 configured internally therein. The console 30 has its own processor and control system in communication with the server 20 via the communications network 19. The console 30 may also be in communication with an external display 24, as discussed above, or can convey the personalized message 22 to the player 16 via its own dedicated screen. The console 30 (with integrated transmitter 12) thus functions as the BTLE beacon in transmit or peripheral mode, while the player's smart mobile device 18 is in scan or central mode.

FIG. 2 also depicts that a distance 21 from the player 16 to the transmitter device (within the console 30) can be accurately calculated as a function of signal strength from the signal 14 received by the player's mobile smart device 18. The signal strength increases as the player 16 gets closer to the transmitter. Through calibration of the BTLE-enabled application running on the player's device 18 (or on the receiver in the location 10 if the BTLE beacon is carried by the player 16) for distance as a function of signal strength, the distance 21 between the player 16 and console 30 is accurately determined. This function may be useful for embodiments wherein the distance 21 causes certain game functions to be initiated at the console 30. The distance 21 can be broken down into segments, such as "close" or "immediate", wherein certain actions are initiated as the player 16 moves from one segment into the other segment.

With respect to FIG. 1, because the distance between the ticket checker 28 (with transmitter 12) and the console 30 is fixed and known, the distance between the console 30 and the player 16 is readily calculated by inclusion of the distance between the console 30 and the transmitter 12.

Figure 3:
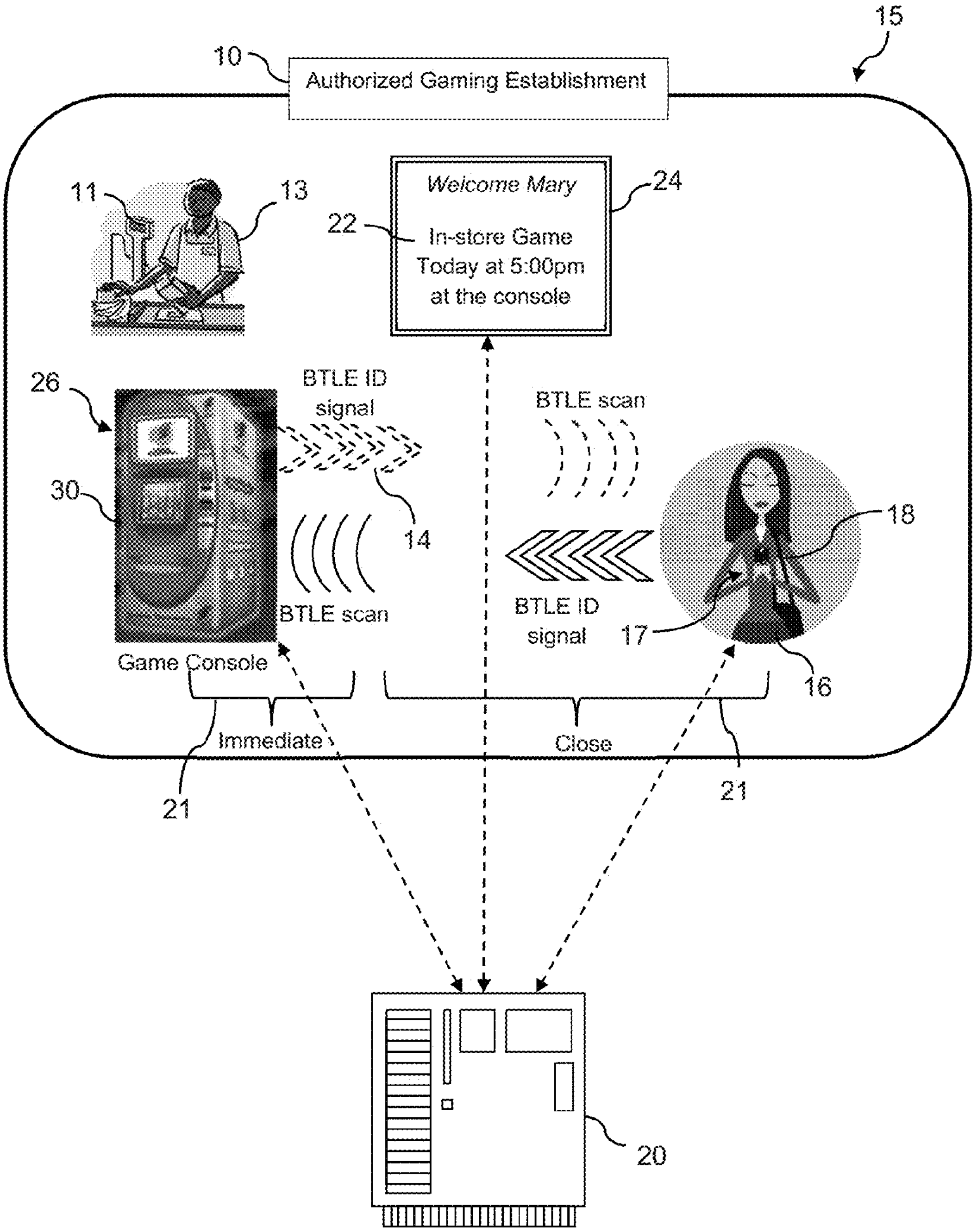
FIG. 3 is a diagram illustration of another embodiment of a system and method wherein a player visits a communication-enabled location to play all or part of a game.

FIG. 3 depicts an embodiment wherein the functions of the game console 30 and the player's mobile smart device 18 are switched. In this embodiment, the console 30 is configured with BTLE scan capability, and is in communication with the server 20. The player's device 18 is configured as a transmitter or broadcast device that transmits an ID signal unique to the particular player. For example, the device 18 may have a BTLE beacon configured therewith having a unique ID signal that is associated with a particular player. Alternatively, the player may simply carry a dedicated broadcast device, such as a BTLE beacon in the form a keychain ornament, dongle, or the like. In this embodiment, the mobile smart device 18 may also be in communication with the server 20. The console 30 is in a generally constant scan mode and will detect the unique BTLE signal 14 emitted from a player's device 18 (or separate BTLE beacon) within range and transmit the ID information from the signal 14 to the server 20. The unique ID signal 14 is correlated to a specific person by the server 20, which then generates and transmits the personalized message 22 to the game console 30 and/or to the display 24. The display 24 may be spaced from the console 30, and the message 22 sent to the display 24 may be triggered when the person is within the "close" distance segment. The message 22 on the display is meant to catch the player's attention and invite the player 16 to approach the console 30. When the player 16 enters the "immediate" distance segment, the console 30 may transmit another personalized message 22 that invites the player 16 to play a game or conduct other game activities on the console 30.

FIG. 3 also depicts (in dashed lines) that the player's device 18 and the console 30 may switch between scan mode and transmit mode so as to carry out any of the functions discussed above.

Figure 4:
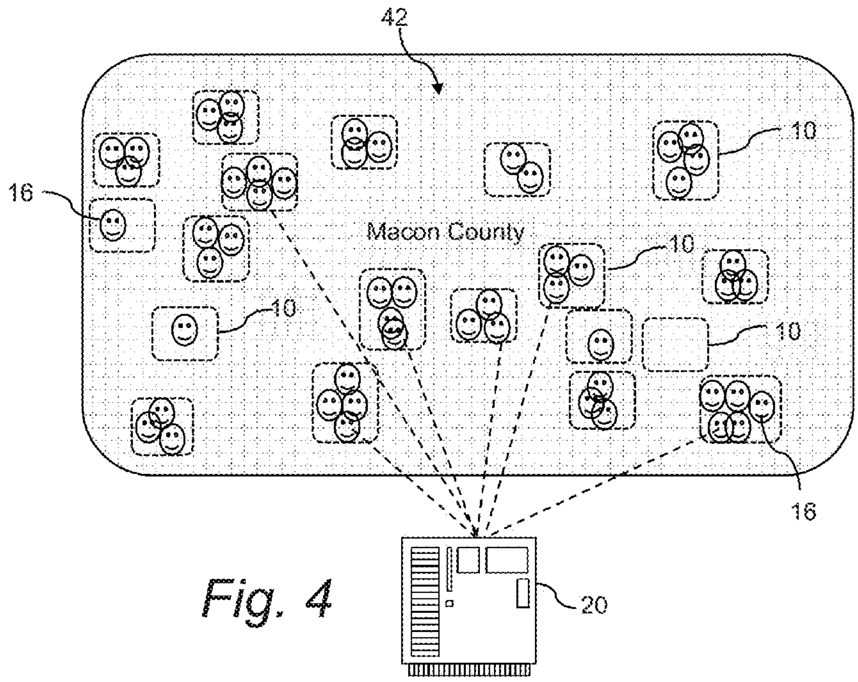
FIG. 4 is a diagram illustration of a gaming server in communication with a plurality of communication-enabled locations within a gaming jurisdiction.

FIG. 4 schematically depicts a partial lottery jurisdiction 42, which may be a county within a larger jurisdiction, such as a state. All of the authorized BTLE-enabled locations 10 are depicted in the display, which may be a map of the jurisdictional area with the locations indicated at their geographic location. As discussed above, BTLE-enabled players 16 that visit the locations 10 are uniquely identified by the server 20. Thus, at any given time, the server 20 is aware of not only the number of players 16 in any give location 10, but also the identity of such players 16. For example, FIG. 4 depicts certain locations 10 with no players, while other locations 10 have one, two, three, or four players. The ability to know exactly how many players 16 are within the plurality of different locations 10, as well as the identity of such players 16, enables unique game opportunities. For example, a game may involve random selection of a player from a pool of the identified players in all of the locations. The time of the drawing may be sent in a personalized message to all of the selected players (e.g., "Mike, you have been entered into a drawing to take place in 10 minutes—Good Luck!). The results of the drawing can be made known to each of the players 16 in another personalized message.

Figure 5:
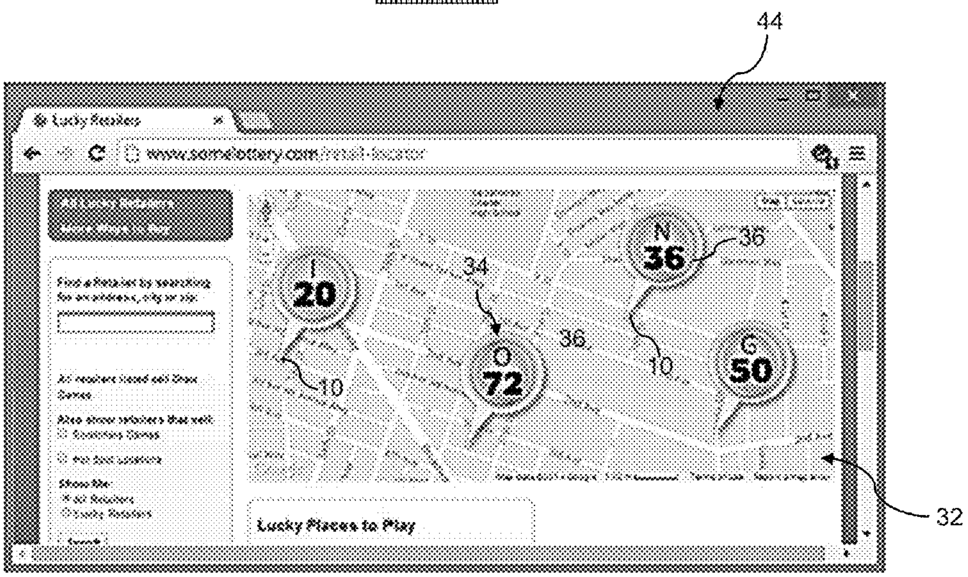
FIG. 5 is a screen shot of a web page displaying a plurality of authorized communication-enabled locations, as well as a particular player indicia assigned to each location.

FIG. 5 is a screen shot of a functional display that may be provided to players 16 in the form of an electronic map 32 that gives the location of the BTLE-enabled locations 10 within a given jurisdiction (or geographic region of the jurisdiction). This map may be linked to other websites that can provide directions to a particular location 10 from the player's present location (or any other location entered by the player). If the player's device used to access the electronic map 32 is GPS enabled (or has other geo-location capability), the player's current geographic location may also be displayed on the map 32. Thus, at any desired time, the players can access the website and determine via the electronic map 32 if a participating location 10 is close by. FIG. 5 also depicts an option wherein game indicia or tokens 34 that have been assigned to each location 10 are identified to the players 16 via the map function. These tokens 34 may be "free" or "bonus" game pieces that the player uses to complete a pattern, puzzle, or the like in a primary, bonus, or second chance game. For example, the tokens 34 depicted in FIG. 5 are Bingo balls 36 (with Bingo numbers) that the player may use to complete a Bingo card, as discussed above. With this embodiment, the player can pick and choose the locations 10 they wish to visit as a function of the token 34 that will help their chances of winning the game. The token 34 may be automatically "credited" to the player when the player visits the particular BTLE-enabled location 10 and the transmit/receive communications discussed above are completed. For example, the player 16 may have one or more electronic game cards stored in their respective player account that is saved in the server 20 (or peripheral memory). The server 20 knows the identity of the particular player, and accesses the cards in the player's account. The token 34 is then automatically applied to the player's game cards. As discussed, players that do not visit one of the locations 10 may not be entitled to this "free" game token 34.

In an alternative embodiment, the player 16 may be required to perform an action in addition to just visiting the location 10. For example, the player may be required to purchase an item at the location 10, or enter a code that is strategically provided somewhere in the location 10 to encourage the player to view merchandise and hopefully make a purchase.

Figure 6:
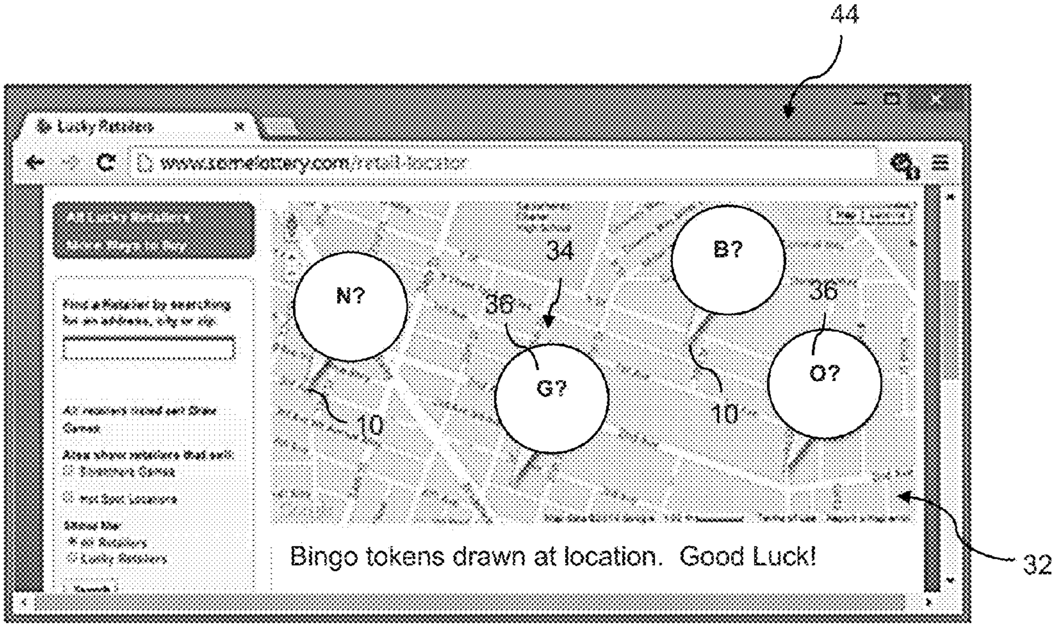
FIG. 6 is a screen shot of a web page displaying a plurality of authorized communication-enabled locations, as well as an indication that tokens are randomly generated at each communication-enabled location, while partially identifying the tokens.

The screen shot in FIG. 6 is similar to that of FIG. 5 in that it provides the geographic location of the participating BTLE-enabled locations 10 within the geographic area. However, the tokens 34 are not made completely known to the player. For example, the tokens 34 may be Bingo numbers 36 that are only partially identified on the map as "N?" or "G?." If player needs a Bingo number in the "N" column, then they know which location 10 to visit for the chance of collecting such number. The actual tokens assigned to the locations 10 may be randomly generated at the time the player 16 visits the location 10. Alternately, the tokens 34 may be randomly assigned beforehand, but are not made known to the player until they visit the location 10.

As another option, the players 16 may be made aware of the times in which the game tokens 34 are changed, or how long the game tokens 34 will remain available at the respective locations 10. These times may be indicated in any appropriate manner on the electronic map 32.

Figure 7:
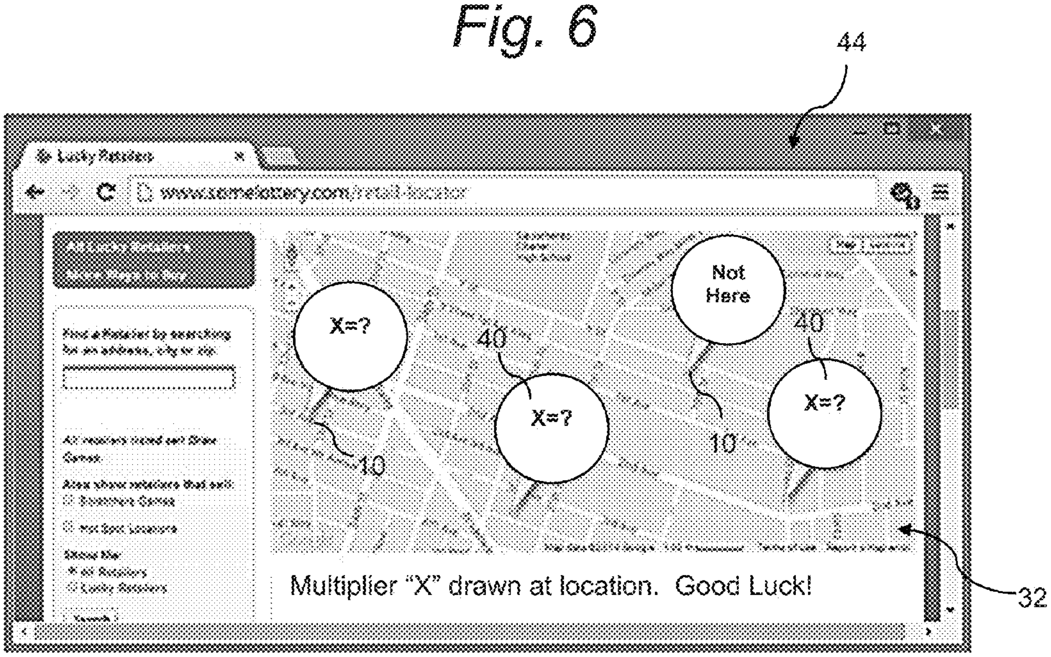
FIG. 7 is a screen shot of a web page displaying a plurality of authorized communication-enabled locations, as well as an indication of multiplier values to be drawn at each location.

The screen shot in FIG. 7 also provides the geographic location of the participating BTLE-enabled locations 10 within the geographic area. However, in this embodiment, the game tokens assigned to each location 10 are not made known to the player. For example, the token 34 may be a "bonus" or multiplier of "X" value (e.g., 2X, 3X, 4X . . . ) that is randomly generated at the time the player 16 visits the location 10. Alternately, the multiplier is randomly assigned beforehand, but is not made known to the player until they visit the location 10. This multiplier may be applied to a prize award in a primary lottery game, a second-chance lottery game, and so forth, as understood by those skilled in the art.

With some embodiments, the game-related activity or function at the BTLE-enabled location 10 to be performed by the players may be an event or activity conducted in the location 10, such as a contestant game show between players 16 at different locations. For example, as described above, the game server 20 is able to identify all of the players 16 and their respective communication-enabled location 10 at any given time. The game server 20 may randomly select contestants for a game show from all of the players 16 in the communication-enabled locations 10. A personalized message can be generated and sent to the players 16 in the communication-enabled locations 10 that informs the respective players 16 of the game show and whether they were selected to compete in the game show. The game shows are conducted with the game consoles 30 in the communication-enabled locations 10 that are in communication with the game server 20, wherein players 16 from different locations compete against each other via the game consoles 30.

The players 16 may be lottery game players within a lottery jurisdiction and have a respective player's account maintained by the lottery jurisdiction. Thus, the players 16 are registered with the gaming authority by way of their account and may become eligible for selection as a contestant in the game show upon visiting a respective communication-enabled location 10 without further requirements placed on the player 16. In other embodiments, the players 16 may be required to satisfy an additional activity at the communication-enabled location 10 prior to becoming eligible for random selection in a drawing from a pool of other players 16 at the other communication-enabled locations 10 to be a contestant in the game show. This additional activity may be, for example, a lottery game-related activity at the locations, such as purchase of a ticket, redemption of a prize, checking status of ticket, and so forth. Functional components 26 may be provided in the communication-enabled locations 10 to allow the players to perform the game-related activities, the functional components 26 including any combination of a ticket checker 28, interactive game console 30, audio-video display 24, and game terminal 11, as discussed above.

Figure 8:
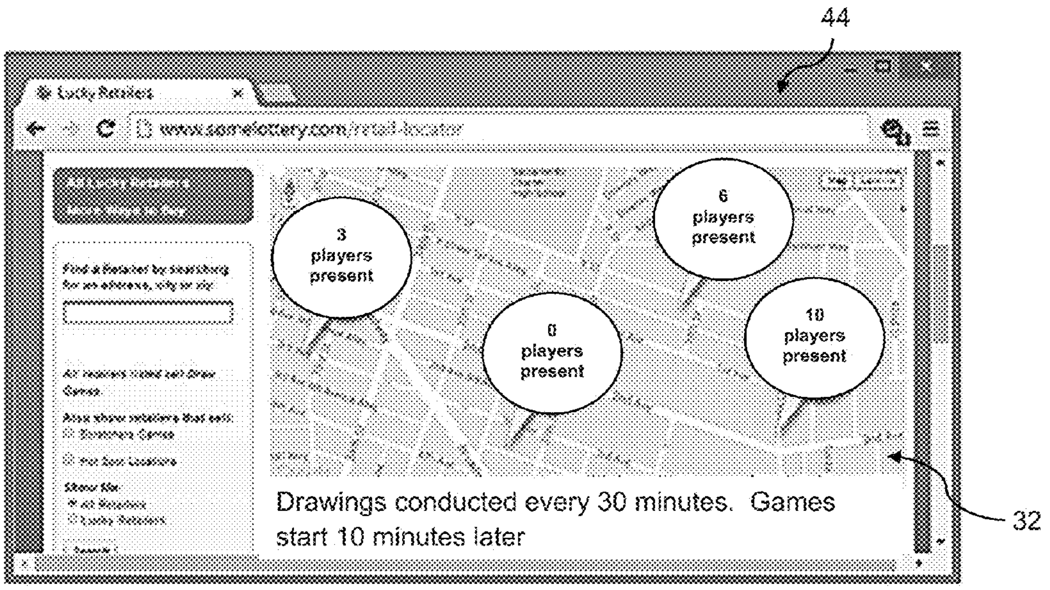
FIG. 8 is a screen shot of a web page displaying a plurality of authorized communication-enabled locations, as well as the number of eligible players for an in-store game show present at the location at a given time.

Related to the game show embodiment, FIG. 8 is a screen shot of a functional display that may be provided to players 16 in the form of an electronic map 32 that gives the location of the BTLE-enabled locations 10 within a given jurisdiction (or geographic region of the jurisdiction). Thus, at any desired time, the players can access the website and determine if a participating location 10 is close by. FIG. 8 also depicts an option wherein the number of players 16 at each location at any given time is presented to the players 16. With this information, players 16 can pick and choose the locations 10 they wish to visit to improve their chances of being selected in a drawing for the game show.

Figure 9:
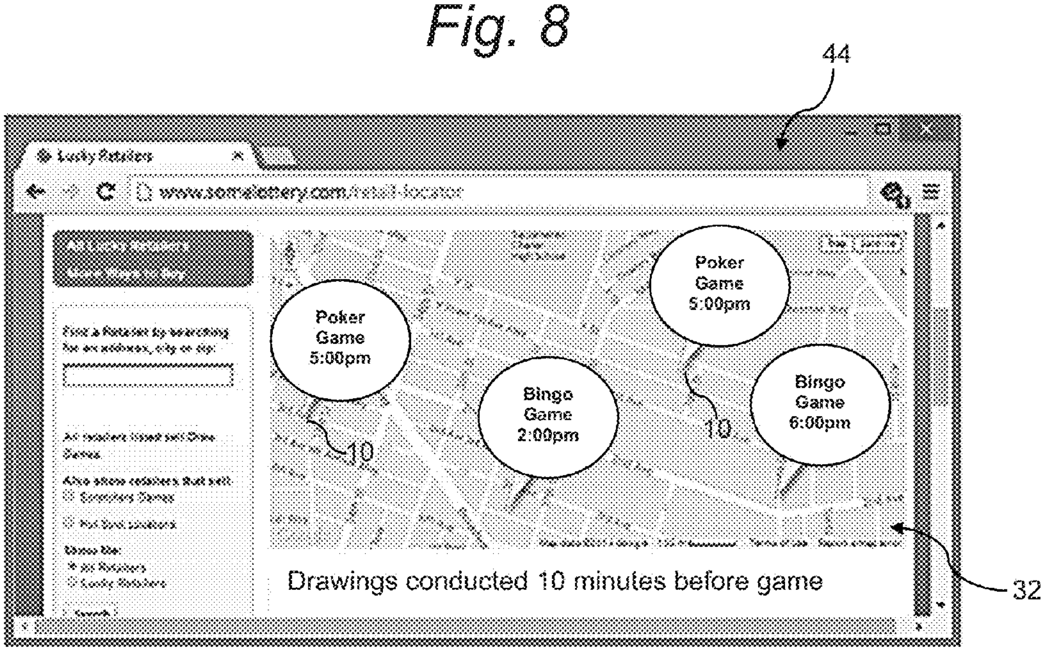

The screen shot in FIG. 9 is similar to that of FIG. 8 in that it provides the geographic location of the participating BTLE-enabled locations 10 within the geographic area. Each location is also identified with the type of game show that will be conducted at the location 10, as well as the time. In this regard, the players can pick and choose which game show they would prefer to be a contestant in. FIG. 9 thus depicts that different game shows can be conducted at different times and with different participating locations 10.

In other words, for the Poker Game Show scheduled for 5:00 pm, two of the locations will participate (not all of the locations 10).

The various system 15 configurations discussed above with respect to FIGS. 1 through 6 enable method embodiments in accordance with aspects of the invention. For example, a method is provided for enabling performance by players of game-related activities or functions at authorized physical locations, such as a retail establishment, convenience store, bar/pub, or any other establishment authorized by the gaming authority (e.g., a lottery authority) to conduct gaming activities. The method includes designating a plurality of the physical locations as authorized communication-enabled locations, wherein such locations are configured with a transmitter device, such as a BTLE beacon, that broadcasts a unique ID signal, or a receiver that is configured to receive respective unique ID signals generated by a device carried by the player into the location.

The players are provided with the capability to receive the unique ID signals emitted by the transmitter devices within the communication-enabled locations on a mobile smart device, or to broadcast the ID signal unique to the player for receipt by the receiver in the communication-enabled locations.

A game server is common to the communication-enabled locations, wherein for each player in one of the communication-enabled locations, the game server receives a transmission that includes at least part of the ID signal unique to the respective communication-enabled location or the ID signal unique to the player. The game server is thereby able to identify all of the players and their respective communication-enabled location. The server may then generate and transmit a personalized message to the player with information as to what activities and functions are available at the location, and how to perform such activities.

The method includes providing the identity and location of the communication-enabled locations via an electronic map accessible by the players, the electronic map also informing the players of the game-related functions that are able to be performed by the players at each of the respective communication-enabled locations.

In a particular embodiment, the player visits one of the communication-enabled locations to increase their likelihood of success in a game of chance, or obtain an increased prize value in the game of chance, compared to players in the game of chance who do not visit one of the communication-enabled locations. Here, the electronic map may identify to the players game indicia or tokens in the game of chance assigned to each of the respective communication-enabled locations that the players may collect for use in the game of chance upon visiting the respective communication-enabled location. In one embodiment, the game of chance is a lottery game within a defined lottery jurisdiction, and the communication-enabled locations are retail locations within the lottery jurisdiction authorized for sale of lottery tickets.

The lottery game may be a draw game wherein an initial defined number of play indicia selected by the player, or randomly generated for the player, from a set of indicia are compared with final game indicia randomly drawn from the set of indicia to determine winning plays of the lottery game, players that visit one of the communication-enabled locations awarded one or more additional play indicia from the set of indicia to increase a likelihood of success in the draw game, the electronic map at least partially identifying the additional play indicia assigned to the respective communication-enabled locations. In one embodiment, the lottery game is a draw Bingo game and the additional play indicia are additional Bingo numbers that may be used by the player to complete a pattern on a Bingo card. With this embodiment, each communication-enabled location within the lottery jurisdiction may be assigned a randomly generated Bingo number that may be used by the player to complete a pattern on their respective Bingo card. The identity and location of the additional Bingo numbers may be published on the electronic map either before or after a drawing event wherein final Bingo numbers are randomly drawn for use by all players in the draw Bingo game.

In still other embodiments, the lottery game is a draw game, and players in the draw game are awarded a location-particular multiplier in the draw game for visiting one of the communication-enabled locations that increases an award generated in the draw game. The electronic map may identify which of the communication-enabled locations will award a multiplier. This multiplier may replace a lower multiplier that the player purchased in the draw game, or add to such lower multiplier. With this embodiment, the location-specific multiplier may be randomly drawn at the communication-enabled location at the time of the player's visit. Alternatively, the multiplier may be pre-assigned to the respective locations, and made known to the players only after visiting the locations.

In yet another embodiment, the game server randomly selects contestants for a game show from all of the players in the communication-enabled locations. The game show can be conducted with game consoles between players in different ones of the communication-enabled locations, wherein the players become eligible for selection in a drawing as a contestant in the game show upon visiting one of the respective communication-enabled locations. With this embodiment, the electronic map can notify the players of scheduled game show times at each communication-enabled location, and may also notify the players of the number of other players present at each of the communication-enabled locations.

In the game show embodiment, the communication-enabled locations may be divided into groups, with the different groups participating in different game shows. The electronic map may identify which of the different games are conducted at specific communication-enabled locations.

It should be appreciated by those skilled in the art that various modifications and variations may be made present invention without departing from the scope and spirit of the invention. It is intended that the present invention include such modifications and variations as come within the scope of the appended claims.

What is claimed is:

1. A method for enabling performance by players of game-related activities at authorized physical locations, such as retail establishments, the method comprising:

designating a plurality of set physical locations as authorized communication-enabled locations, each physical location being a knowing pre-authorized participant in the game-related activities related to the method, wherein each location is configured with a transmitter device that is located at the location and broadcasts an ID signal within a limited range that encompasses public areas of the location accessible to the players, the ID signal unique to the communication-enabled location, or each location configured with a receiver that receives an ID signal unique to a particular player in the public areas of the location;

providing the players with capability to receive the unique ID signals emitted by the transmitter devices within the communication-enabled locations on a mobile smart device, or to broadcast the ID signal unique to the player for receipt by the receiver in the communication-enabled locations;

providing a game server that is common to the communication-enabled locations, wherein for each of the players in one of the communication-enabled locations, the game server receives a transmission that includes at least part of the ID signal unique to the respective communication-enabled location or the ID signal unique to the player, the game server thereby identifying all of the players and their respective communication-enabled location; and providing the identity and location of all of the participating communication-enabled locations to all of the players via an electronic map accessible by the players before the players commence the game-related activities, wherein each player is free to choose any one of the participation locations to commence the game regardless of the player's actual starting location, the electronic map also informing the players of game-related functions that are able to be performed by the players at each one of the respective communication-enabled locations so that, before the game commences, the player is able to decide on which of the communication-enabled locations to visit based on the identified game-related functions.

2. The method as in claim 1, wherein the player visits one of the communication-enabled locations to increase their likelihood of success in a game of chance, or obtain an increased prize value in the game of chance, compared to players in the game of chance who do not visit one of the communication-enabled locations, the electronic map identifying to the players game indicia or tokens in the game of chance assigned to the respective communication-enabled locations that the players may collect for use in the game of chance upon visiting the respective communication-enabled location.

3. The method as in claim 2, wherein the game of chance is a lottery game within a defined lottery jurisdiction, and the communication-enabled locations are retail locations within the lottery jurisdiction authorized for sale of lottery tickets, and wherein the transmitter or the receiver configured in a lottery game functional component located in the communication-enabled location that performs an operation related to sale, verification, or advertising of lottery tickets at the communication-enabled location.

4. The method as in claim 3, wherein the lottery game is a draw game wherein an initial defined number of play indicia selected by the player, or randomly generated for the player, from a set of indicia are compared with final game indicia randomly drawn from the set of indicia to determine winning plays of the lottery game, players that visit one of the communication-enabled locations awarded one or more additional play indicia from the set of indicia to increase a likelihood of success in the draw game, the electronic map at least partially identifying the additional play indicia assigned to the respective communication-enabled locations so that the player can make a determination if the additional play indicia actually benefits the player before travelling to the respective communication-enabled location.

5. The method as in claim 4, wherein the lottery game is a draw Bingo game and the additional play indicia are additional Bingo numbers that may be used by the player to complete a pattern on a Bingo card.

6. The method as in claim 5, wherein each communication-enabled location within the lottery jurisdiction is assigned a randomly generated Bingo number that may be used by the player to complete the pattern on their respective Bingo card, the location and at least partial identity of the additional Bingo numbers published on the electronic map either before or after a drawing event wherein final Bingo numbers are randomly drawn for use by all players in the draw Bingo game.

7. The method as in claim 4, wherein the lottery game is a draw game, and players in the draw game are awarded a location-particular multiplier in the draw game for visiting one of the communication-enabled locations that increases an award generated in the draw game, the electronic map identifying which of the communication-enabled locations will award a multiplier.

8. The method as in claim 7, wherein the multiplier is randomly drawn at the communication-enabled location at the time of the player's visit.

9. The method as in claim 1, wherein the game server randomly selects contestants for a game show from all of the players in the communication-enabled locations, the game show conducted with game consoles between players in different ones of the communication-enabled locations, the players becoming eligible for selection as a contestant in the game show upon visiting one of the respective communication-enabled locations.

10. The method as in claim 9, wherein the electronic map notifies the players of scheduled game show times at each communication-enabled location.

11. The method as in claim 9, wherein the electronic map notifies the players of the number of other players present at each of the communication-enabled locations.

12. The method as in claim 9, where the communication-enabled locations are divided into groups, with the different groups participating in different game shows, the electronic map identifying which games are conducted at specific communication-enabled locations.

13. The method as in claim 1, wherein the players are provided one or more of: (1) an application for download to a mobile smart device, the application enabling receipt and recognition by the mobile smart device of the unique ID signals emitted by the transmitter devices within the communication-enabled locations; (2) an application for download to a mobile smart device that causes the mobile smart device to transmit the ID signal unique to the player for receipt by the receiver in the communication-enabled locations; or (3) a personal broadcast device that broadcasts the ID signal unique to the player.

14. The method as in claim 13, wherein the game server is in secure communication with one or all of: the player's mobile smart device; the receiver at the communication-enabled location; or a functional component at the communication-enabled location that communicates with the player.

* * * * *